UNITED STATES PATENT OFFICE.

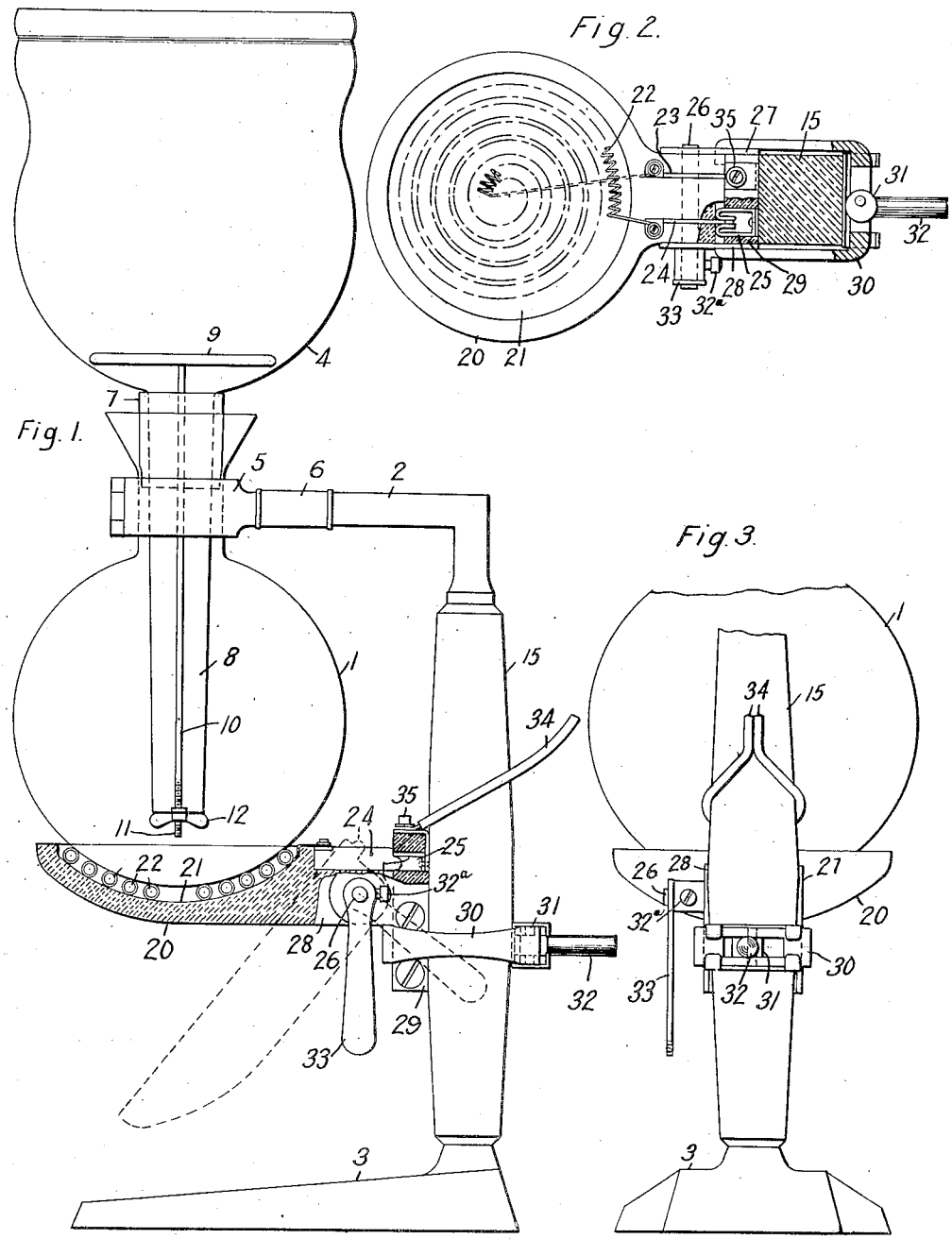

THEODORE ABTMEYER, OF WILKINSBURG, AND FRANK THORNTON, JR., OF PITTSBURGH, PENNSYLVANIA, ASSIGNORS TO WESTINGHOUSE ELECTRIC AND MANUFACTURING COMPANY, A CORPORATION OF PENNSYLVANIA.

ELECTRIC HEATING DEVICE.

1,236,642.  Specification of Letters Patent.  Patented Aug. 14, 1917.

Application filed April 6, 1915. Serial No. 19,450.

*To all whom it may concern:*

Be it known that we, THEODORE ABTMEYER, a citizen of the United States, and a resident of Wilkinsburg, in the county of Allegheny and State of Pennsylvania, and FRANK THORNTON, Jr., a citizen of the United States, and a resident of Pittsburgh, in the county of Allegheny and State of Pennsylvania, have invented a new and useful Improvement in Electric Heating Devices, of which the following is a specification.

Our invention relates to electric heating apparatus, and it has for one of its objects to provide an electric heating device for use in connection with certain types of coffee percolating apparatus.

Another object of our invention is to construct an electric heating device which can be moved into and out of operative position and which shall be provided with a switching device whereby current will be supplied to the heater only when the heater is in its operative position.

Of the accompanying drawings, Figure 1 is a side elevational view, with parts in section, showing a coffee percolator equipped with a heater constructed in accordance with our invention. Fig. 2 is a plan view, partially in section, showing the heating device and the manner of its attachment to the percolator, and Fig. 3 is a rear elevational view of a portion of the structure shown in Fig. 1.

The percolating device shown in the drawing comprises a glass bowl 1 suspended from a horizontal arm 2 of a stand 3 and adapted to receive a glass funnel 4. The suspension of the bowl 1 from the arm 2 is effected by means of a hinged ring 5, one-half of which is rigidly secured to the arm 2, while the other movable half is provided with a lug adapted to rest against the arm 2 and to be secured in position by means of a slidable collar 6. A perforated stopper 7 is adapted to be disposed in the neck of the bowl 1 and to receive the stem 8 of the funnel 4. A circular strainer 9, carried by a rod 10, is disposed in the bottom of the funnel 4, the rod 10 extending to the end of the stem 8, where it terminates in a threaded portion 11 with which a wing nut 12 coöperates to maintain the strainer 9 in position in the funnel 4.

The structure thus far described constitutes a well-known commercial type of coffee percolator, which is operated by placing water in the bowl 1, assembling the parts in the position shown, placing pulverized coffee in the funnel 4 and applying heat to the bowl 1. The water boils and gradually ascends into the upper part of the funnel and permeates the coffee contained therein. When nearly all of the water has left the bowl 1, the heat is removed and the vapor within the bowl condenses, thereby reducing the pressure therein and causing the coffee solution to return to the bowl. This percolating operation may be repeated as often as desired by alternately applying and removing the source of heat.

According to our present invention, we provide an electric heater for carrying out the foregoing operations. As shown, this heater comprises a body of cement or other insulating material 20 provided with a depression 21 which is hollowed out to conform to the exterior of the bowl 1 and in which is disposed a coil of resistance material 22. The resistance coil may conveniently be a helix of resistance wire spirally coiled in the manner shown in Fig. 2. The ends of the coil are respectively connected to terminal plates 23 and 24 which are embedded in the cement 20, as shown in Figs. 1 and 2, and which are provided with rounded ends that extend beyond the cement body portion and coöperate with terminal clips, one of which is shown at 25 in Fig. 2. The body portion 20, with its heating coil 22 and the terminals 23 and 24, is rigidly mounted on a pivot pin 26 that is rotatably mounted in bearings formed in plates 27 and 28 which are secured to a block 29 of insulating material. The block 29 is adapted to be adjustably supported upon the vertical member 15 of the stand 3 by means of a yoke 30 that carries an eccentric cam device 31 operated by means of a handle 32.

To the pivot pin 26 is secured, by means of a set screw 32ª, a handle 33, by means of which the heating device may be pivotally turned with the pin 26. The pivot pin 26 should be tightly seated in its bearings, so that the heater will remain in any angular position to which it may be turned. Current is supplied to the terminal clips through conductors 34 and binding posts 35.

In applying our heating device to the type of coffee percolator described above, the insulating block 29 is placed against the vertical member 15 of the stand 3, to the shape of which it is preferably made to conform. The yoke 30 is passed around the vertical support 15 from the rear and below the block 29, and is raised to grasp the block 29, as shown in Fig. 1. The yoke is then secured in place by means of the eccentric clamp 31. The position of the block 29 should be so adjusted that, when the heater is in its horizontal position as shown in Fig. 1, the heating coils will be in contact with the bowl 1. It will be observed that, in this position, the terminal plates 23 and 24, connected to the coil 22, are in engagement with the terminal clips 25 and that, if energy is supplied to the conductors 34, the resistance coils 22 will be energized and heated. When nearly all of the liquid in the bowl 1 has been caused to ascend into the funnel 4, the heater should be turned downwardly around the pivot 26 by means of the handle 33, taking, for example, the position shown in dotted lines in Fig. 1. In this position of the heater, the terminal contact plates 24 are out of engagement with the terminal clips 25, and the current in the heating coils is therefore interrupted. When the liquid has again descended into the bowl 1, the current is readily reëstablished, if desired, by turning the heater into its horizontal or operative position.

It will be evident from the foregoing description, and from the drawing, that our heating device provides simple and convenient electrical means for applying heat to percolating devices of the kind described. The principle of the switching device which forms a part of our invention may also be applied to other forms of heating apparatus in which the heating element may assume operative and inoperative positions and in which it is desirable to interrupt the current when the heating device is moved into its inoperative position. The structural details of the device described above may be variously modified without departing from the scope of our invention, and it is therefore to be understood that no limitations are to be imposed upon our invention except such as are indicated in the appended claims.

We claim as our invention:

1. An electric heating device comprising a relatively stationary support, a heater element pivotally connected thereto, and means for supplying current to the said heater element at one position of the said element and for interrupting the current at another position of the said element.

2. An electric heating device comprising a relatively stationary support, a heater element pivotally connected thereto, and means for supplying current to the said heater element at one angular position of the said element and for interrupting the said current at another angular position of the said heater element.

3. An electric heating device comprising a vessel for receiving material to be heated, a pivoted heater element adjustably supported adjacent to the said vessel, and means for supplying current to the said heater element at one angular position of the said element and for interrupting the current at another angular position of the said element.

4. An electric heater comprising a heating element, terminals therefor, a pivoted support carrying the said element and the said terminals, and contact members adapted to engage the said terminals at one angular position of the said support and to be out of engagement with the said terminals at another angular position of the said support.

5. An electric heating device comprising a vessel for receiving material to be heated, an electric heater comprising a heating element shaped to conform to the exterior of the said vessel, means for adjustably supporting the said heater adjacent to the said vessel, means for supplying current to the said heating element, and means for manually removing the said heater from contact with the said vessel and for simultaneously interrupting the supply of current to the said heating element.

6. An electric coffee-percolating device comprising a receptacle for coffee, a receptacle for liquid communicating with the said coffee receptacle, a support for the said receptacles, and an electric heater removably attached to the said support adjacent to the said liquid receptacle.

7. An electric coffee-percolating device comprising a receptacle for coffee, a receptacle for liquid communicating with the said coffee receptacle, a support for the said receptacles, an electric heater removably and pivotally secured to the said support adjacent to the said liquid receptacle, means for supplying current to the said heater, and means for manually removing the said heater from contact with the said liquid receptacle and for simultaneously interrupting the supply of current to the said heater.

In testimony whereof, we have hereunto subscribed our names this 31st day of March, 1915.

THEODORE ABTMEYER.
FRANK THORNTON, Jr.